United States Patent
Boudouris et al.

[15] 3,640,611
[45] Feb. 8, 1972

[54] CONTROL FOR MOTION PICTURE PROJECTORS

[72] Inventors: Angelo Boudouris, Sylvania; Stanley J. Kulish, Jr., Holland; Harold M. Plumadore, Toledo, all of Ohio

[73] Assignee: Eprad Incorporated, Toledo, Ohio

[22] Filed: Nov. 21, 1969

[21] Appl. No.: 878,611

[52] U.S. Cl. ............................................. 352/92, 352/124
[51] Int. Cl. ......................................................... G03b 21/50
[58] Field of Search ............................................. 352/92, 124

[56] References Cited

UNITED STATES PATENTS

| 1,972,904 | 9/1934 | Pritchard | 352/92 X |
| 2,007,214 | 7/1935 | Proctor | 352/124 X |
| 2,437,252 | 3/1948 | Gould | 352/124 |
| 2,473,468 | 6/1949 | Cooley | 352/92 X |

FOREIGN PATENTS OR APPLICATIONS

| 157,122 | 6/1954 | Australia | 352/92 |
| 576,844 | 6/1959 | Canada | 352/92 |
| 711,478 | 7/1954 | Great Britain | 352/92 |
| 711,481 | 7/1954 | Great Britain | 352/92 |

*Primary Examiner*—Louis R. Prince
*Assistant Examiner*—Joseph W. Roskos
*Attorney*—Allen D. Gutchess, Jr.

[57] ABSTRACT

Controls for motion picture projectors are designed to automatically change over the operation from one projector to the other to provide continuous showing of sequential reels of film. The controls embody a pickoff device in each projector having two contact shoes, one of which is effective to initiate changeover and the other of which is effective to operate auxiliary controls or circuits. The controls further prevent changeover from one projector to the other in the event of a film break which would cause circuits to be completed through both shoes. An alarm system is also provided which is effective to signal the operator in the event of a film break or lamp failure and also to signal the beginning of a show and the end of the last reel thereof.

8 Claims, 3 Drawing Figures

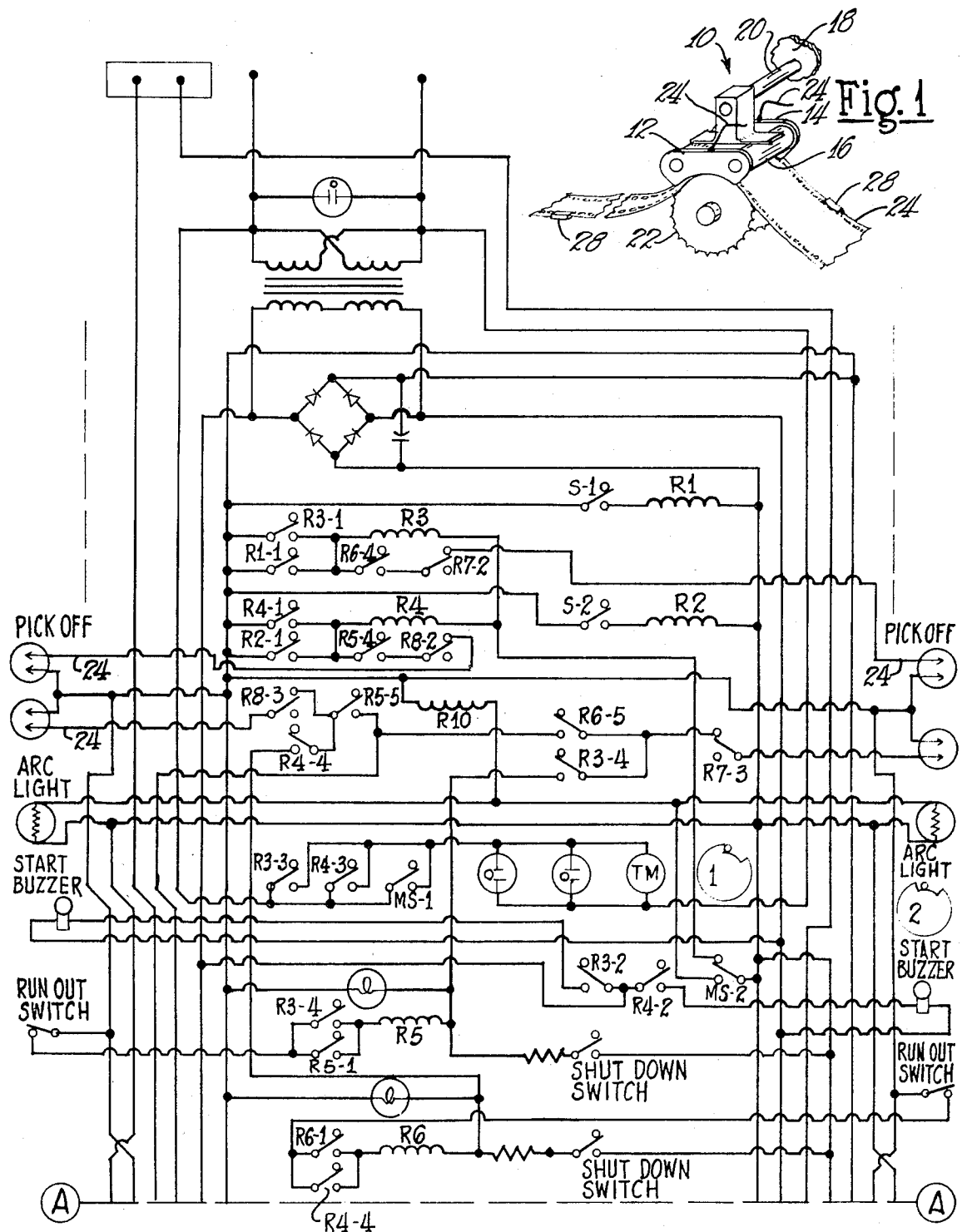

CONTROL FOR MOTION PICTURE PROJECTORS

This invention relates to controls for motion picture projectors and particularly for effecting an automatic changeover of operation from one projector to the other.

Some systems for causing change in operation from one projector to another to provide continuous sequential projection of two reels of film have heretofore been proposed. Such systems generally have had various disadvantages and have been less than fully automated.

The present invention provides an automated changeover control for motion picture projectors in a commercial theater for causing a second projector to operate at a predetermined point relative to the end of a reel of film on a first projector and for causing the film on the first projector to run out after the changeover. The new control causes fully automatic changeover from the first projector to the second and also enables auxiliary controls to be operated for raising and lowering the curtain, brightening and dimming the lights, and starting, stopping or changing the intensity of background music or sound. The changeover control embodying the invention prevents changeover from the first projector to the second in the event of a film break when a false changeover signal would be given. The control also provides an alarm system for signalling an operator of a film break or lamp failure and also to indicate the beginning of a show and the end of the last reel thereof.

It is, therefore, a principal object of the invention to provide a control system for motion picture projectors having the advantages and features outlined above.

Many other features and objects of the invention will be apparent from the following detailed description of a preferred embodiment thereof, reference being made to the accompanying drawings, in which:

FIG. 1 is a schematic view in perspective of a pickoff device embodying two shoes with which the controls of the invention are used;

FIG. 2 is a wiring diagram of part of the controls embodying the invention; and

Figure 2A:
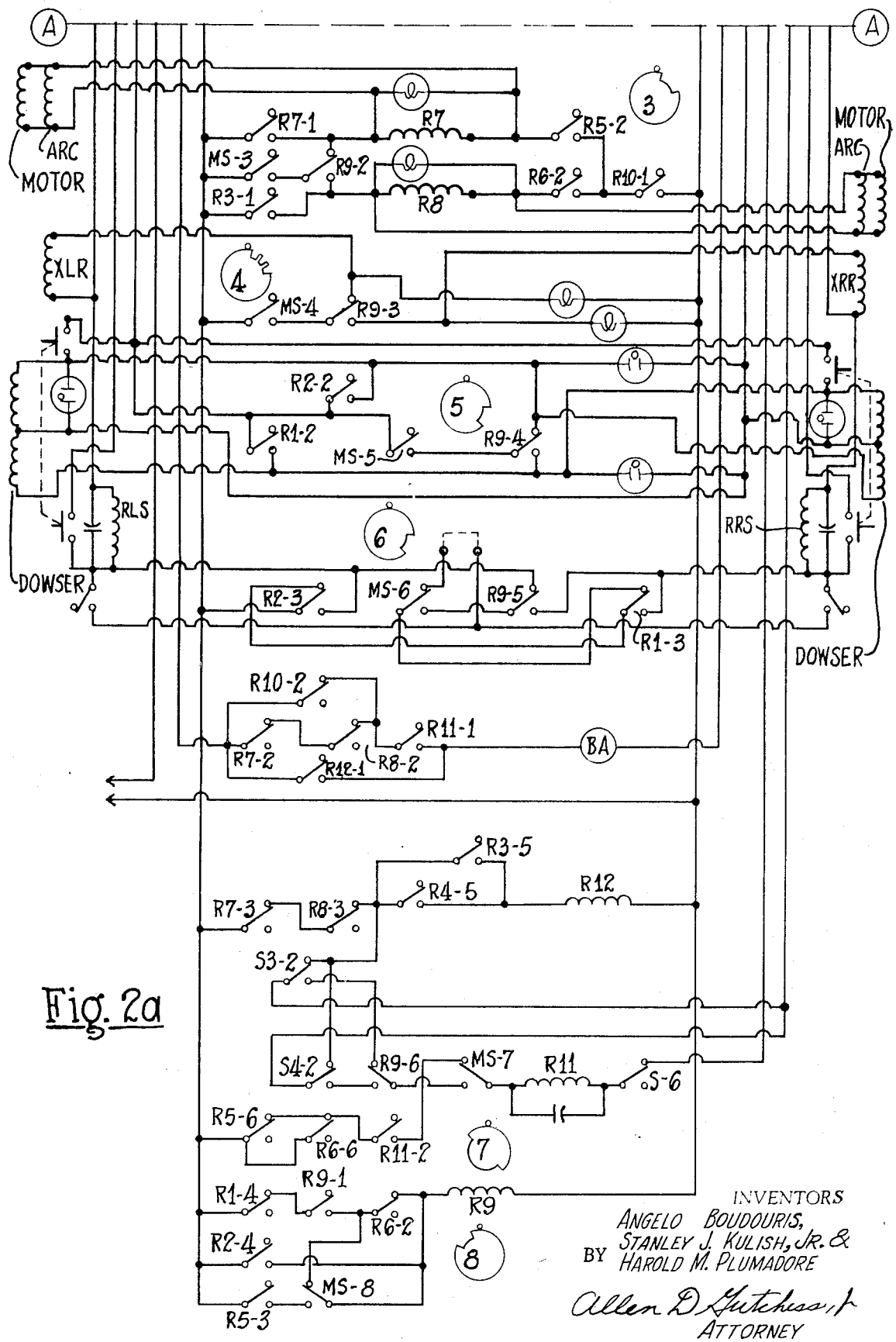
FIG. 2a is a wiring diagram of the remainder of the controls embodying the invention.

Referring to FIG. 1, a pickoff device usable with the controls according to the invention is indicated at 10. The details of the device 10 are discussed in a patent application of Boudouris and Plumadore and do not constitute part of the instant invention. The device includes a pair of contact shoes 12 and 14 connected together by an insulating member 16 and suitably mounted in a sprocket arm or a wall 18 of a projector by a tang or shaft 20. The shoes are mounted adjacent a film sprocket 22 used to drive the film in its path through the projector, with the sprocket preferably being located downstream of the lens system of the projector, but above a runout arm (not shown). Conductors 24 are suitably connected to the contact shoes and the sprocket is grounded. Consequently, when either shoe is in engagement with the sprocket, an electrical path is completed therebetween. Normally, however, the shoes and sprocket are separated by film 26 which is of an insulating nature. When a path is desired to be completed between one of the shoes and sprocket, a metal foil or tab 28 is affixed around the edge of the film and completes a circuit when positioned between one of the shoes and the sprocket. The metal tab can be employed for either of the shoes to provide a path between that shoe and the sprocket. One of the shoes can be used to automatically change operation from the associated projector to the other near the end of a reel of film to automatically start the second reel near the end of the first. The other shoe can be employed to operate auxiliary devices in the theater when a path is completed between that shoe and the sprocket. For example, auxiliary controls can be used to operate the curtain, the lights, or background music.

Before discussing details of the circuit, a brief description of the operation will be set forth. Both projectors are initially threaded with film, closing the film runout switch on each projector, this switch preferably being located near the takeup reel, and below the pickoff devices. This switch is designed to shut down the projector in the event of a film break. To start the left projector, for example, a start pushbutton switch is depressed, which energizes a first relay. A sequence timer is started which rotates a plurality of cams through one revolution, the cams being shaped to open and close switches associated therewith in a predetermined pattern. A buzzer on the left projector controller is momentarily operated to warn the operator that the left projector is about to start. As the timer continues to rotate, signals therefrom operate the motor, sound, and arc relays in the left projector controller. A xenon strike relay is then sequentially operated to assure that the xenon arc lamp for the left projector is lighted. Seven seconds after the projector motor starts, the timer activates the picture and sound changeover circuits to project the picture on the screen and start the sound.

An alarm circuit is provided which allows an audible alarm to sound in the event of a malfunction. The alarm also sounds briefly when the film is started and as the last reel ends to notify the operator. The signal is inoperative during the changeover sequence, but the system will still shut down immediately if a malfunction occurs during that time.

In order to make a changeover from the left projector to the right one, for example, after the left one has been manually placed in operation, a piece of metal foil is employed on the outside edge of the film in the vicinity of the usual visible changeover mark thereon near the end of the reel. When the foil is sensed by the pickoff device in the left projector, it energizes a right sensing relay and starts the sequence timer. A buzzer in the right projector controller is again sounded to warn the operator of the change over before the projector motor starts. The timer then generates a signal to operate the motor and arc relays as before with the xenon strike relay again operated three times sequentially and with the picture and sound changed over 7 seconds after the motor starts.

Before the show is ended and changeover stopped, a toggle switch for the appropriate projector is moved to the shutdown position. This can be done any time during the last reel of film being shown on the other projector. Now when the foil on the film passes the pickoff device, the nonoperating projector is prevented from starting.

The sequencing circuit for starting a projector and for changing over the film from one projector to the other basically comprises a number of relays and a timer having a number of cams and switches. The relays include a start relay R1 for the left projector and a start relay R2 for the right projector. A sensing relay R3 for the left projector and a sensing relay R4 for the right projector further control certain changeover steps and relays R5 and R6 for the two projectors further advance the operation. Relays R7 and R8 operate the motors and arc-rectifiers of the projectors. A transfer relay R9 connects the proper circuitry into the operation depending upon which projector is operating. A relay R10 senses whether the arc light of the appropriate projector is functioning. An alarm relay R11 is effective to provide a signal in case of a malfunction, such as the extinction of the arc light or the breaking of a film. Finally, an intermission relay R12 also operates the alarm temporarily to provide the operator with an indication of when the show starts and when a film is to run out and an intermission is to take place. This alarm can be located remotely from the booth, at a central location for the operator, for example, especially if the operator is in control of two or more theaters.

The timer motor operates eight cams or wafers which are driven through one revolution in a period of about 30 seconds, to complete a cycle each time a changeover is to occur. This period is long enough for the film on the first projector to run out. The cams cooperate with the above-mentioned twelve relays to effect the overall desired sequencing operations. The timer cams are illustrated in the positions they assume at the beginning of a sequence.

In the drawing, the components to the left of the left-hand dotted line are found in the left-hand projector or in the controller associated with the left projector. The central components are part of the main sequence circuit in a separate sequencer housing. To the right of the right-hand dotted line, the components are shown for the right projector controller or the right-hand projector. Pilot and indicator lamps are shown but are not discussed.

Assuming now that the projectors are properly threaded and that the left start button, which is a pushbutton switch and is closed only as long as it is held in, is pushed by the operator, the left projector will be started. When the "start left" switch designated S-1 is closed, it energizes start relay R1 which closes its contacts R1-1 to energize the "sense left" relay R3. The relay R3 holds itself in through contacts R3-1 with the circuit being completed through contacts MS-2 operated by a second cam of the timer, the contacts MS-2 being in the position shown when the timer motor is at rest. When the timer starts and the cams rotate, the switch contacts MS-2 change position after about 2 seconds, when the follower moves out of the notch. Contacts R3-2 of the relay R3 also close immediately and energize a left start buzzer to warn the operator that the left projector is about to run. This is a safety feature preventing possible injury to the operator in the event he is working on the projector at the time. This buzzer operates for about two seconds, until contacts MS-2 drop out relay R3.

Contacts R3-3 of the relay R3 also close to start the timer motor designated TM in the drawing. Contacts MS-1 close before the contacts R3-3 open to maintain the motor TM in operation. Operation of the timer rotates the timer cams and initiates the sequence. As the cams rotate, the follower for the contacts MS-2 moves out of the notch of cam 2 to deenergize the relay R3, causing the contacts R3-2 to open and the buzzer to stop. When the cam 1, as well as the other cams, have completed one revolution, the contacts MS-1 open again to stop the motor.

If the projector were properly threaded, a runout switch therein would be closed. The runout switch has an arm engaging the film near the takeup reel and is closed when the film is threaded in the projector and ready to run. With the runout switch closed and the relay R3 energized to close contacts R3-4, an "enable" relay R5 is energized if a shut-down toggle switch for the left projector is in the automatic or closed position. The relay R5 is then held in by its contacts R5-1.

The relay R5 remains energized until the film runs out or unless the film breaks. The relay R5 has contacts R5-2 which close to render a "left run" relay R7 ready to be energized when additional contacts are closed. These include relay contacts R9-2 and switch contacts MS-3 which close as the timer operates, these contacts closing about 2 seconds after the timer motor begins. The switch contacts MS-3 also energize a motor relay and an arc relay to start the projector motor and render the lamp ready for operation. By the time the contacts MS-3 close, contacts R10-1 of the "arc check" relay will be closed to complete a circuit through the motor and lamp relays. The "arc check" relay R10 closes when the second cam moves far enough to move the contacts MS-2 to the down position. This completes a circuit through the relay R10 until the cams and timer complete one revolution. The relay R7, when energized, is held in by its contacts R7-1. These contacts also hold the motor and lamp relays energized unless contacts R5-2 or R10-1 open. The projector motor will then operate until the film runs out or the lamp fails.

Before the left motor is started and the lamp is lighted, the left dowser is closed. For this purpose, the relay R1 has an additional set of contacts R1-2 which energize the closing relay of the left dowser and also open the right dowser, although the latter is immaterial at this time since the right-hand projector is not operating. The closing of the left dowser eliminates flickering on the screen which would otherwise occur before the projector motor reaches speed. The dowsers remain in this position even through the contacts R1-2 open until the motor of the projector reaches speed, by which time switch contacts MS-5 move to the opposite position in about seven seconds, and cause the dowsers to change positions.

A sound relay RRS for the right projector is activated initially through contacts R1-3 with the sound for the left projector being off until the film attains speed, thereby eliminating a series of acoustical blips which might otherwise occur. After about seven seconds, switch contacts MS-6 of the sixth cam move downwardly when the follower reaches the notch and by this time the first relay R1 is deenergized. Consequently, a path for a sound relay RLS of the left projector is completed through the switch contacts MS-6, the first relay contacts R1-3, and contacts R2-3. A jumper down in dotted lines can be added for particular sound systems, if required. With the jumper, the relay RLS will continue to be energized through the jumper when the switch contacts MS-6 change again. A capacitor across the relay RLS holds it in as the contacts MS-6 change.

The transfer relay R9 through its various contacts determines whether the components of the left projector or the right projector will be activated. In the circuit shown, the contacts for this relay are in their deenergized positions, ready to operate the left hand projector. When the start left button was pushed, contacts R1-4 in the transfer relay circuit opened to assure that the transfer relay will be deenergized. If the relay R9 is energized at this time, it is deenergized by the opening of the first relay contacts R1-4. The transfer relay R9 then remains deenergized until near the end of the 30-second-cycle of the cam timer, at which time contacts MS-8 close to establish a circuit for the transfer relay through contacts R5-3 which are now closed. The transfer relay R9 is then energized and ready for the changeover from the left to the right projector. When the contacts MS-8 move up again after the cam notch is passed, the relay R9 will be held in through the contacts R1-4, R9-1, and R6-2. When the contacts R6-2 open after a changeover to the right projector, the path for the relay R9 is still established through the contacts R1-4, R9-1, and the switch contacts MS-8.

Upon changeover to the right projector, the contacts R6-2 open and when the contacts MS-8 again move down or close near the end of this 30-second-cycle of the cam timer, the relay R9 is then deenergized since the contacts R5-3 are now open. The relay R9 will then remain deenergized ready for the next changeover to the left projector once again.

When a xenon lamp is employed which does not have a self-striking feature, a fourth cam MS-4 of the timer supplies three sequential pulses to the xenon lamp which are ordinarily sufficient to cause it to operate. These pulses are established for ½ second with a 1-second interval between adjacent pulses. For this purpose, contacts MS-4 close sequentially three times to pulse the xenon lamp relay for the left machine, with contacts R9-3 of the transfer relay shown in the deenergized or upper position.

In the event the xenon lamp does not light or is extinguished, the resistance of the arc light sensing cell will be high and cause the arc check relay R10 to drop out after the circuit through contacts MS-2 is broken. The contacts R10-1 then open to shut down the projector by deenergizing the motor and arc relays. Also, if the film breaks, the runout switch moves to the opposite position and shuts down the projector by deenergizing the relay R5 and opening its contacts R5-2. If the film breaks before reaching the pickoff device, then pulses would be provided to both shoes of the pickoff device, normally indicating a changeover, but such is prevented with the circuit as will be discussed subsequently.

A booth alarm BA can be located at a remote point if desired rather than at the booth. This enables one operator to control more than one theater. This alarm will operate upon a film break, or a malfunction in the lamp of the operating projector, and will operate until a reset switch is opened by the operator. The alarm also will operate for about 2 seconds at the beginning and at the end of a reel of film.

Switch contacts S3-2 or S4-2 of the shutdown toggle switches will be in the lower or automatic position, in which instance, a circuit will be established through transfer relay contacts R9-6 and switch contacts MS-7 of the seventh cam when closed or in the down position. Prior to closing of the contacts MSd7, the alarm relay R11 will be inoperative during the first part of a changeover to prevent false signals. The alarm relay R11 will then be energized, closing its contacts R11-1 in series with the booth alarm BA when the contacts MS-7 move up again. If the lamp should fail, arc check relay R10 will drop out and its contacts R10-2 will move to the deenergized, upper position shown and activate the alarm. The alarm will then remain energized until an alarm reset switch S-6, in series with the alarm relay R11, is opened. If the film breaks, and contacts R7-2 move to the deenergized position, again the booth alarm BA will be activated.

When the left-hand projector is initially started by closing switch S1, and the relay R3 is energized, its contacts R3-5 close to complete a circuit through intermission relay R12. Its contacts R12-1 then close to activate the booth alarm BA, but only temporarily. After about 2 seconds, the relay R7 is energized and its contacts R7-3 open to drop out the intermission relay R12. The short signal indicates to the operator that the motion picture is starting. At the end of the film, the booth alarm BA also operates for a short period to indicate that the show is over or intermission is beginning. At the end of the show, the switch contacts S3-2 or S4-2 will be in the upper, shutdown position. A circuit is then completed through relay contacts R3-5 or R4-5 to energize the intermission relay R12 again. The relay R4 will be deenergized shortly thereafter when contacts MS-2 cause it to drop out as the cams again rotate once at the end of the film to attempt to start a changeover.

A changeover sequence, rather than a start-up, will now be briefly discussed. Assume that the left projector is running and is near the end of the reel with a changeover being due. When a conducting tab on the film edge reaches a position between the one shoe of the pickoff device and its corresponding sprocket, a conducting path is completed therebetween and a circuit is completed through contacts R8-2 and R5-4. The right sensing relay R4 is then energized through contacts MS-2 and is held in through contacts R4-1 until the circuit through switch contacts MS-2 opens. The right start buzzer is also operated through contacts R4-2 and the timer motor TM is operated through contacts R4-3. Relay R6 is energized through contacts R4-4, and the right projector motor and arc relay are then operated through contacts R6-2, R10-1, and R9-2 when the contacts MS-3 close after about 2 seconds.

The xenon lamp for the right projector will then be pulsed by the contacts MS-4 through the lower position of the contacts R9-3 three times to assure that the right-hand lamp is operative. After a period of seven seconds, the second dowser for the right-hand projector is opened through the switch contacts MS-5 and the lower position of contacts R9-4 with the dowser for the left-hand projector simultaneously being closed. The right sound relay RRS also will be energized after seven seconds through contacts R9-5 and switch contacts MS-6. The jumper again will hold in this relay if necessary for the particular sound system employed.

The transfer relay R9 has been energized for the right projector before this time and the arc sensing relay R10 again is temporarily energized through contacts MS-2 when the follower of contacts MS-2 moves out of the notch of the second cam. The alarm relay R11 is deenergized during part of the changeover and the alarm will not operate even if the xenon lamp does not light or if the film breaks, for about a 10-second period. However, the projector will still shut down in the event of a malfunction during this time.

The other pickoff shoe is used for other external functions such as for brightening and dimming the lights, raising or lowering the curtain, starting and stopping various background music. When a conducting tab is received between the other shoe and the sprocket for the left projector, a path is completed through contacts R8-3 and R5-5, to the plug or socket for an auxiliary controller.

In the event of a film break above the pickoff device on the left projector, both shoes will contact the sprocket and complete an electrical path therewith after the end of the broken film runs through. The relay R4 will be pulled in and attempt to start the right projector but contacts R4-4 are closed, completing a path through the other shoe and preventing the relay R6 from being energized since there is the same potential supplied to both sides of this relay. The timer mechanism will start and run through a cycle when the relay R4 is energized. However, this has no effect on the operation. The logic sequence through the relay R9 will be falsely transferred but the operation must again be started through the start left or start right pushbuttons anyway, at which time the sequence will be again correctly set up. The picture and sound changeover are applied to the right machine but this is advantageous since there is then no sound or light on the left projector thereby to facilitate repairing of the film break.

Various modifications of the above-described embodiment of the invention will be apparent to those skilled in the art and it is to be understood that such modifications can be made without departing from the scope of the invention, the embodiment shown and described being primarily for purposes of illustration and not limitation.

We claim:

1. A changeover system for motion picture projectors, each having a pair of contact shoes mounted therein normally in engagement with a conducting film sprocket when there is no film between said shoes and said sprocket, first circuit means connecting one of said shoes and said sprocket and effective to change over the operation to a second projector when a conducting path is completed between said one shoe and said sprocket, additional circuit means connected to the other shoe and the sprocket for activating an auxiliary circuit when a conducting path is completed between said other shoe and said sprocket, and means associated with said first circuit means for preventing operation of the second projector when there is no film between said shoes and said conducting sprocket and conducting paths are completed between both of said shoes and said sprocket of said first projector.

2. A changeover system according to claim 1 characterized further by a remotely located signal, means for continuously operating said signal in the event of a film break in the operating projector or in the event of a light failure in the operating projector, and means for operating said signal for a short period of time when one of the projectors is first started and when the last reel of film of a show is substantially finished.

3. A changeover system for motion picture projectors, each having a pair of contact shoes mounted thereon, each of said projectors also having an arc lamp, first circuit means connecting one of said shoes and effective to change over the operation to a second projector when a conducting path is completed between said one shoe and an adjacent film sprocket, additional circuit means connecting the other shoe for activating an auxiliary circuit when a conducting path is completed between said other shoe and said sprocket, and timing means associated with said first circuit means for supplying a predetermined number of sequential pulses at predetermined intervals to the arc lamp of the projector to which change over is being made.

4. A changeover system according to claim 3 characterized further by a relay electrically associated with lamps of both projectors, said relay being deenergized in the event of a failure of the lamp of the projector in operation, and means to energize said relay for a predetermined period during a change over from one projector to the other to prevent deenergization of said relay if both lamps are out during the period.

5. A changeover system according to claim 3 characterized further by each of said projectors having a runout switch effective to open and shut down the projector in the case of a film break, said first circuit means being effective to maintain the first projector in operation after change over to the other projector, until the runout switch of the first projector opens, thereby enabling the film on the first reel to run out.

6. A control system for controlling sequential operation of motion picture projectors comprising control means associated with the first projector for changing operation to a second projector at a predetermined time relative to the operation of the first projector signal means producing a signal, means for continuously operating said signal means in the event of a film break in the operating projector, means for continuously operating said signal means in the event of a lamp failure in the operating projector, means for operating said signal means for a short, predetermined period of time when a projector is started, and means for operating said signal means for a predetermined period of time when the last reel of film of a motion picture show is substantially finished.

7. A control system according to claim 6 characterized further by each of said projectors having a runout switch effective to open and shut down the projector in the case of a film break, and circuit means effective to maintain the first projector in operation after change over to the other projector, until the runout switch of the first projector opens, thereby enabling the film on the first reel to run out.

8. A control system according to claim 6 characterized further by means for temporarily rendering said signal means inoperative during a portion of a change over of operation from one projector to the other.

* * * * *

UNITED STATES PATENT OFFICE
CERTIFICATE OF CORRECTION

Patent No. 3,640,611          Dated February 8, 1972

Inventor(s) Angelo Boudouris, Stanley J. Kulish, Jr. & Harold M. Plumadore

It is certified that error appears in the above-identified patent and that said Letters Patent are hereby corrected as shown below:

In Col. 7, Line 5, correct the punctuation by inserting a comma after the word "projector".

Signed and sealed this 13th day of June 1972.

(SEAL)
Attest:

EDWARD M. FLETCHER, JR.
Attesting Officer

ROBERT GOTTSCHALK
Commissioner of Patents